(12) United States Patent
Duemmel

(10) Patent No.: US 8,322,666 B2
(45) Date of Patent: Dec. 4, 2012

(54) PORTABLE AND ADJUSTABLE STAND

(76) Inventor: Heath Duemmel, Holt Summit, MO (US)

( * ) Notice: Subject to any disclaimer, the term of this patent is extended or adjusted under 35 U.S.C. 154(b) by 0 days.

(21) Appl. No.: 13/252,602

(22) Filed: Oct. 4, 2011

(65) Prior Publication Data
US 2012/0085719 A1   Apr. 12, 2012

Related U.S. Application Data

(60) Provisional application No. 61/390,669, filed on Oct. 7, 2010.

(51) Int. Cl.
*F16M 11/38* (2006.01)
(52) U.S. Cl. ............ 248/166; 248/163.1; 248/188.6; 248/288.51; 248/311.2
(58) Field of Classification Search .......... 248/125.3, 248/125.7, 156, 163.1, 163.2, 165, 166, 188.5, 248/188.6, 188.7, 288.31, 288.51, 311.2, 248/436
See application file for complete search history.

(56) References Cited

U.S. PATENT DOCUMENTS

| | | | | |
|---|---|---|---|---|
| 2,173,024 A * | 9/1939 | Park | .................. | 126/30 |
| 3,003,646 A * | 10/1961 | Wolf | ............... | 211/107 |
| 3,405,587 A * | 10/1968 | Meazzi et al. | .................. | 84/421 |
| 4,101,036 A * | 7/1978 | Craig | ............... | 211/107 |
| 4,988,064 A * | 1/1991 | Hoshino | ......................... | 248/170 |
| 5,029,795 A * | 7/1991 | Dexter | ........................ | 248/431 |
| 5,046,699 A * | 9/1991 | Perreault et al. | .............. | 248/533 |
| 5,062,606 A | 11/1991 | Hoshino | | |
| 5,279,488 A * | 1/1994 | Fleming | .................... | 248/279.1 |
| 5,509,629 A | 4/1996 | Sassmannshausen et al. | | |
| 5,848,584 A * | 12/1998 | Brog | ................. | 126/30 |
| 5,913,269 A | 6/1999 | Franssen et al. | | |
| 6,315,252 B1 * | 11/2001 | Schultz | .......................... | 248/160 |
| 6,983,915 B2 * | 1/2006 | Adelman | .................. | 248/125.8 |
| 7,207,450 B1 | 4/2007 | Franklin et al. | | |
| 7,364,125 B2 * | 4/2008 | Speggiorin | ................ | 248/181.1 |

* cited by examiner

*Primary Examiner* — Gwendolyn W Baxter
(74) *Attorney, Agent, or Firm* — Dale J. Ream (57) ABSTRACT

A portable and adjustable stand includes a base assembly having at least three legs pivotally coupled to an end cap and movable between retracted and extended configurations. The stand includes a length adjustable rod having first and second rod members for selectively adjusting the height thereof. The end cap is slidably coupled to a lower end of the first rod member. A drink holder assembly is mounted atop the second rod member. An auxiliary rod member and umbrella holder may be coupled to the second rod member.

11 Claims, 15 Drawing Sheets

PORTABLE AND ADJUSTABLE STAND

CROSS REFERENCE TO RELATED APPLICATION

This non-provisional patent application claims the benefit of provisional application Ser. No. 61/390,669 filed on Oct. 7, 2010, titled Portable and Adjustable Stand.

BACKGROUND OF THE INVENTION

This invention relates generally to adjustable tables and stands and, more particularly, to a portable and adjustable stand specifically configured to be used while tailgating and then stored away.

Tailgating is a term frequently used to describe the social activity of gathering near an athletic even venue, such as a parking lot near a football stadium, to eat, drink, and socialize prior to entering the venue to watch the actual sporting event. Frequently portable grills are used to grill meat products and drinks are enjoyed in a manner similar to that of a picnic or lake party. Soft drinks or beer are often consumed from cups or cans. For example, tailgating is popular prior to college or professional football games as a means of cheering on one's favored team and for enhancing the overall fan experience. Specifically, tailgating may include activities such as playing a game of touch football or just playing catch.

A difficulty often experienced by "tailgaters" is having a convenient place to set drink items, such as cups or cans, while participating in grilling, playing catch with a football, Frisbee®, or the like. This is especially difficult since tailgating activities usually take place on the tailgate of a truck or SUV. Various devices have been proposed in the prior art for adjustable tables and stands. Although assumably effective for their intended purposes, the existing devices do not adequately provide a stand that is portable, adjustable, and specifically configurable for use while tailgating.

Therefore, it would be desirable to have a stand that is height adjustable, collapsible for transport and storage, and specifically configured to hold beverage containers, tools used while grilling, and the like.

SUMMARY OF THE INVENTION

A portable and adjustable stand according to the present invention includes a base assembly having at least three legs pivotally coupled to an end cap and movable between storage and extended configurations. The stand includes a length adjustable rod having upper and lower ends, the end cap being slidably coupled to the rod lower end. The rod includes first and second rod members for selectively adjusting the height thereof, the rod members being slidable relative to one another and selectively lockable at desired height. A container assembly is mounted atop the adjustable rod.

Therefore, a general object of this invention is to provide a portable and adjustable stand particularly for use while tailgating before a sporting event.

Another object of this invention is to provide a portable and adjustable stand, as aforesaid, that may be moved between collapsed and extended configurations.

Still another object of this invention is to provide a portable and adjustable stand, as aforesaid, having a stable tripod base and a length adjustable center rod.

Yet another object of this invention is to provide a portable and adjustable stand, as aforesaid, having drink holders.

A further object of this invention is to provide portable and adjustable stand, as aforesaid, that is easy to use and cost-effective to manufacturer.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 7b is an isolated view on an enlarged scale taken from a portion of FIG. 7a;

DESCRIPTION OF THE PREFERRED EMBODIMENT

A portable and extendable stand according to a preferred embodiment of the present invention will now be described in detail with reference to FIGS. 1 to 15 of the accompanying drawings. The stand 10 includes a base assembly 20, a length adjustable rod 50, a mounting arm 62, and a drink holder assembly 64.

Figure 1:
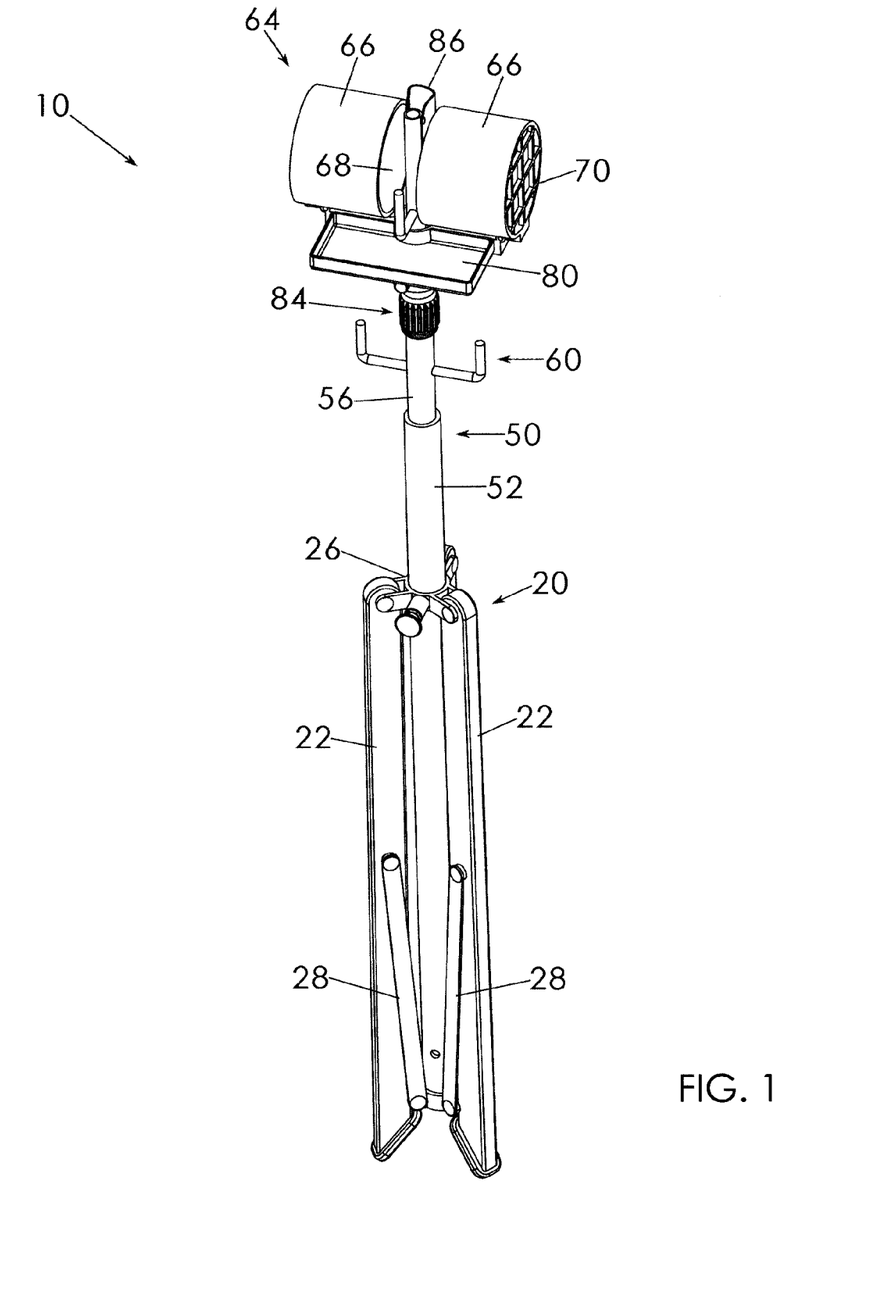
FIG. 1 is a perspective view of a portable and adjustable stand according to a preferred embodiment of the present invention in a storage configuration.
Figure 9:
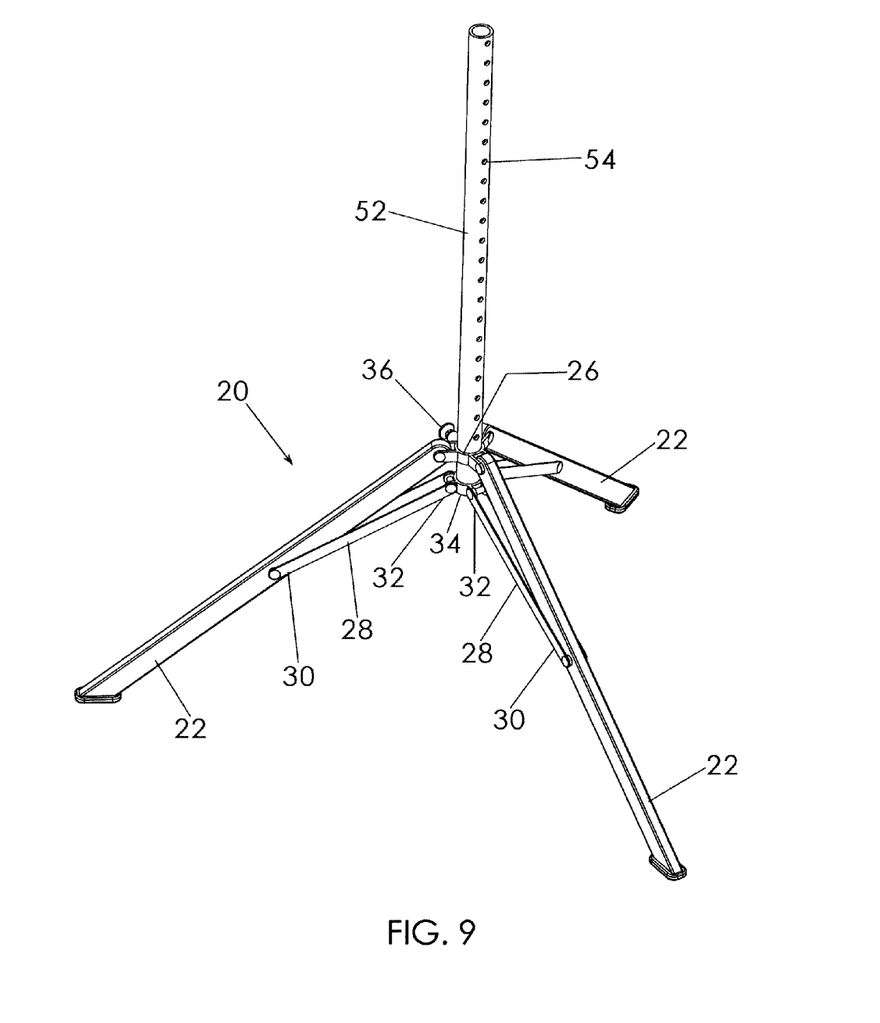
FIG. 9 a perspective view of the base assembly removed from the stand as in FIG. 2.
Figure 10:
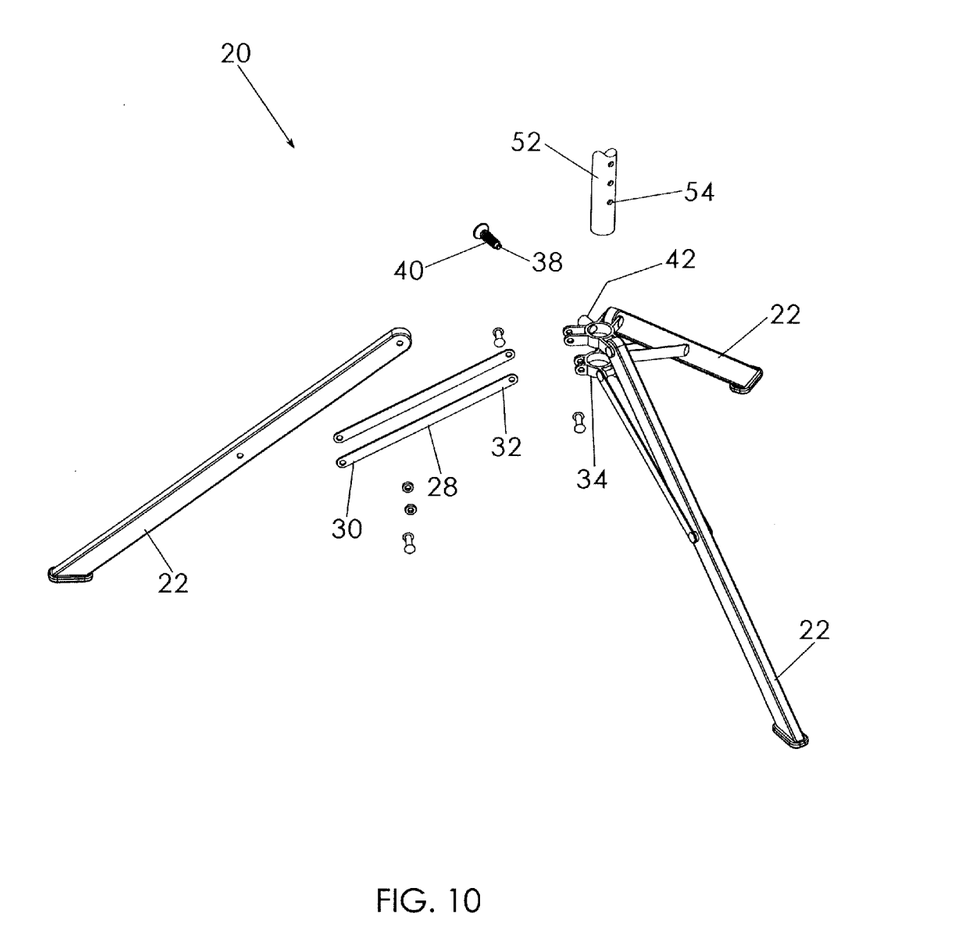
FIG. 10 is an exploded view of the base assembly as in FIG. 9.
Figure 11:
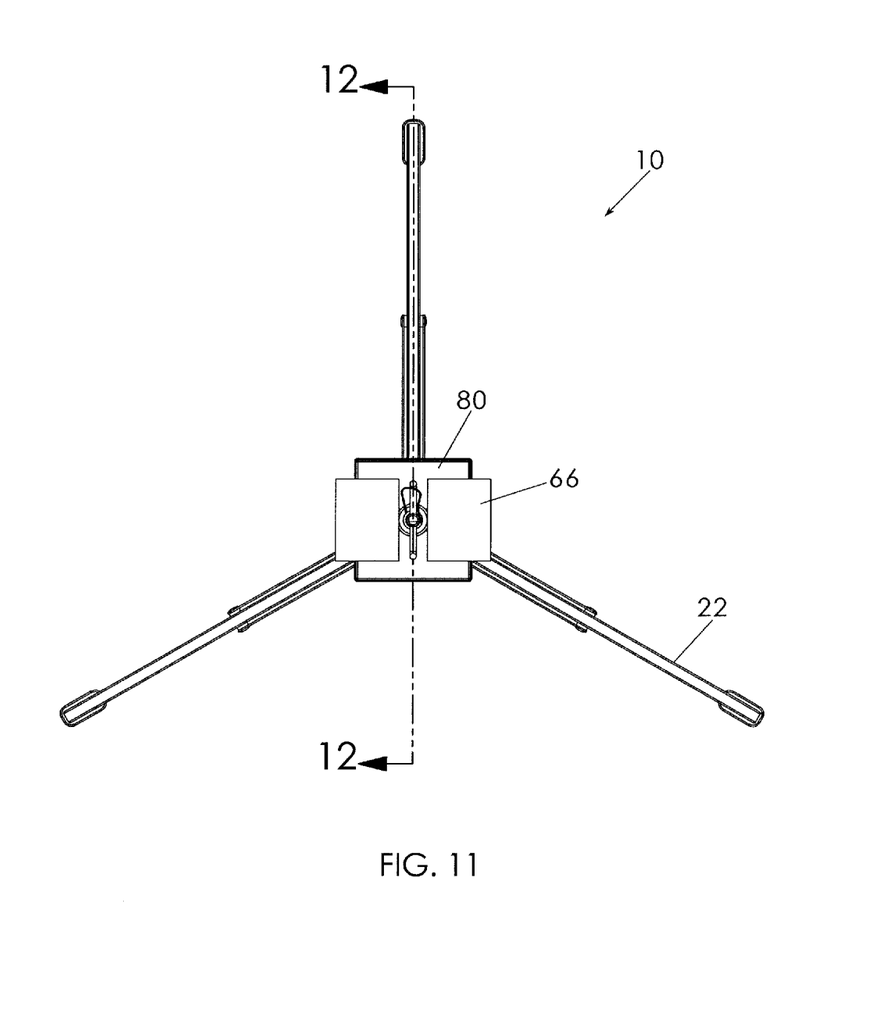
FIG. 11 is a top view of the stand as in FIG. 1.
Figure 12:
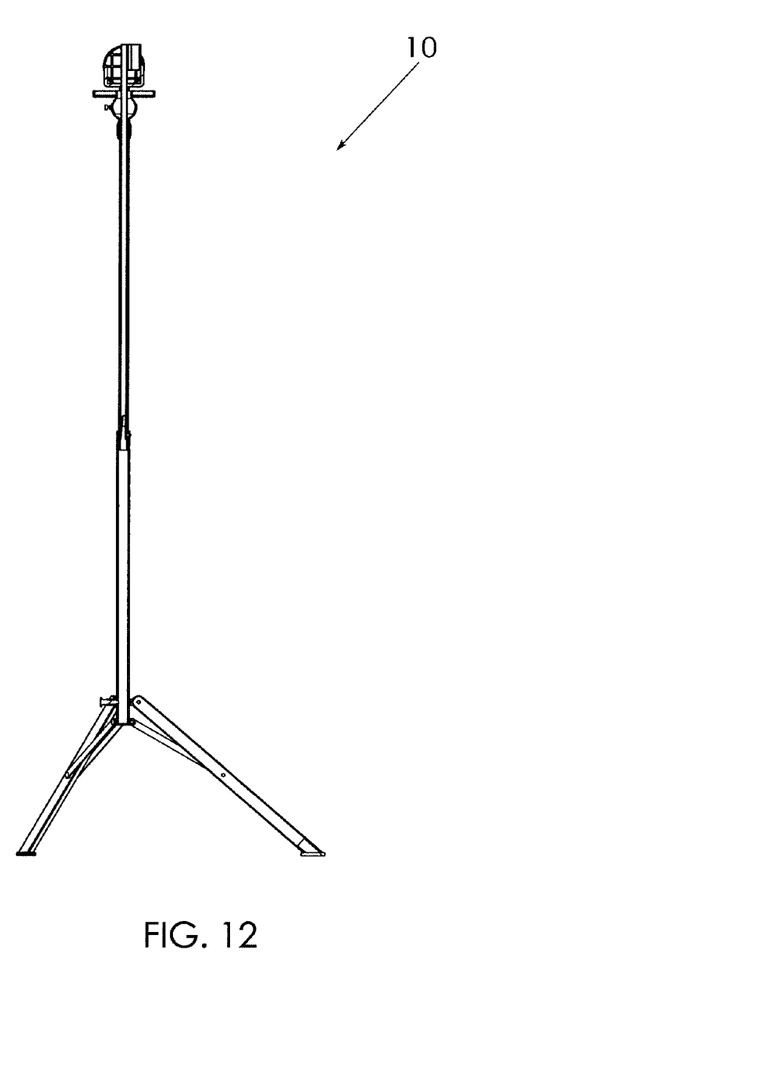
FIG. 12 is a sectional view taken along line 12-12 of FIG. 11.

The base assembly 20 includes at least three legs 22 (also referred to as leg members), each leg 22 having an upper end 24 pivotally coupled to an end cap 26. The end cap 26 has a ring-shaped or arcuate configuration that is slidably coupled to a lower end of a first rod member 52. The legs 22 are pivotally movable between a deployed configuration (FIG. 2) and a retracted or storage configuration (FIG. 1). It is understood that the legs are generally parallel to the length adjustable rod 50 at the retracted configuration (FIG. 1). Each leg 22 includes a support arm 28 pivotally coupled at one end 30 to a respective leg 22 and at an opposed end 32 pivotally connected to an auxiliary end cap 34 (FIGS. 9 and 10). The auxiliary end cap 34 is also configured for slidable attachment to a lower end of the first rod member 52 for movement as will be described later.

The base assembly 20 may be selectively locked at the deployed configuration. More particularly, the base assembly 20 includes a spring plunger 36 operatively coupled to the end cap 26, the plunger 36 having a pin 38 that is biased by a spring 40 to extend through a slide support member 42 to bear against the first rod member 52 in a friction fit arrangement. Accordingly, the plunger 36 causes the base assembly 20 to stay at whatever configuration it is in. Pulling the plunger 36 outwardly, however, releases the plunger 36 from its engagement against the first rod member 52 and allows the legs 22 to be moved, either from the storage configuration to the deployed configuration or vice versa. Releasing the plunger, however, allows the spring 40 to once again urge the plunger 36 to bear against the first rod member 52 and "lock" the base assembly 20.

Figure 4:
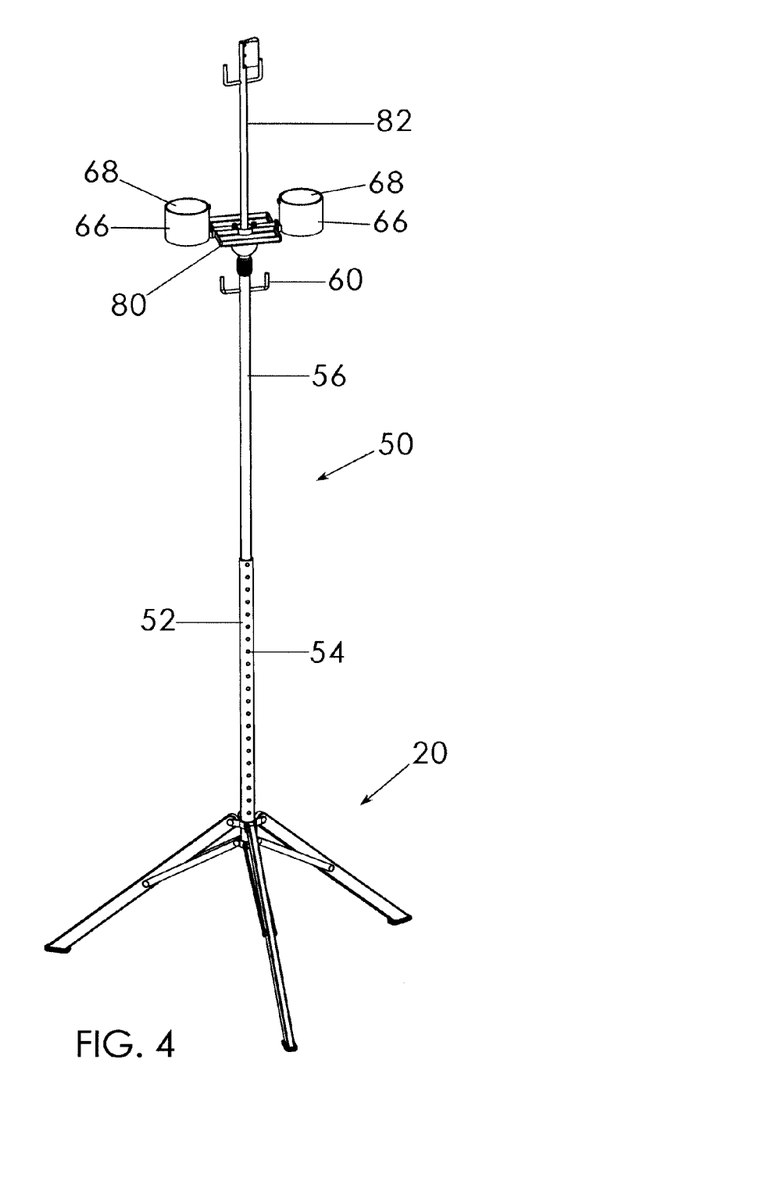
FIG. 4 is a perspective view of the stand as in FIG. 3 with the support arm in an extended configuration.

The rod 50 includes a first rod member 52 and a second rod member 56. Preferably, both members have a cylindrical configuration such that the second member 56 is slidably received into the first member 52 and movable between a retracted configuration (FIG. 2) and an extended configuration (FIG. 4). The first rod member 52 defines a plurality of apertures 54 spaced apart between opposed ends thereof. A fastener 58, such as a spring steel flange is coupled to the second rod member 56 preferably adjacent the lower end thereof that registers with and extends through a respective aperture 54 of the first rod member 52 when the rod members are slidably moved relative to one another. Accordingly, the rod 50 may be adjusted to a user-selected length configuration. It is understood that when the base assembly is moved to the retracted configuration, the rod 50 slides through the end cap 26 (compare FIG. 1 to FIG. 2). One or more hooks 60 may be mounted to the rod 50 on which miscellaneous articles may be attached, such as grilling tools, sunglasses, towels, and so on.

Figure 5:
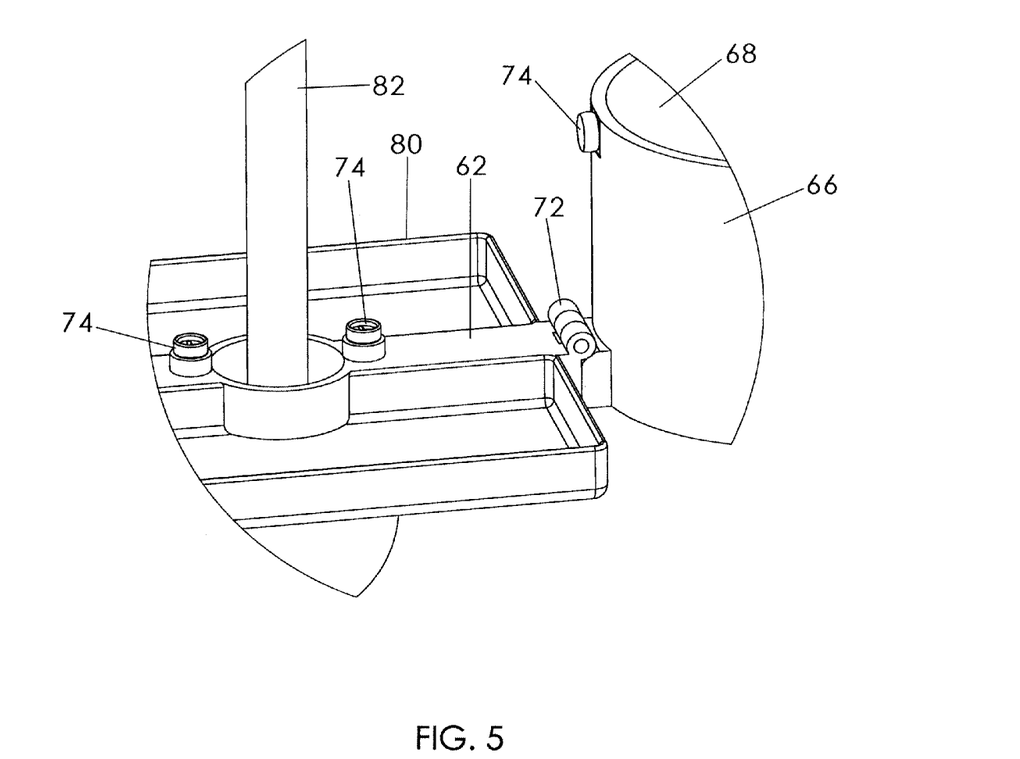
FIG. 5 is an isolated view on an enlarged scale taken from a portion of FIG. 4.
Figure 6:
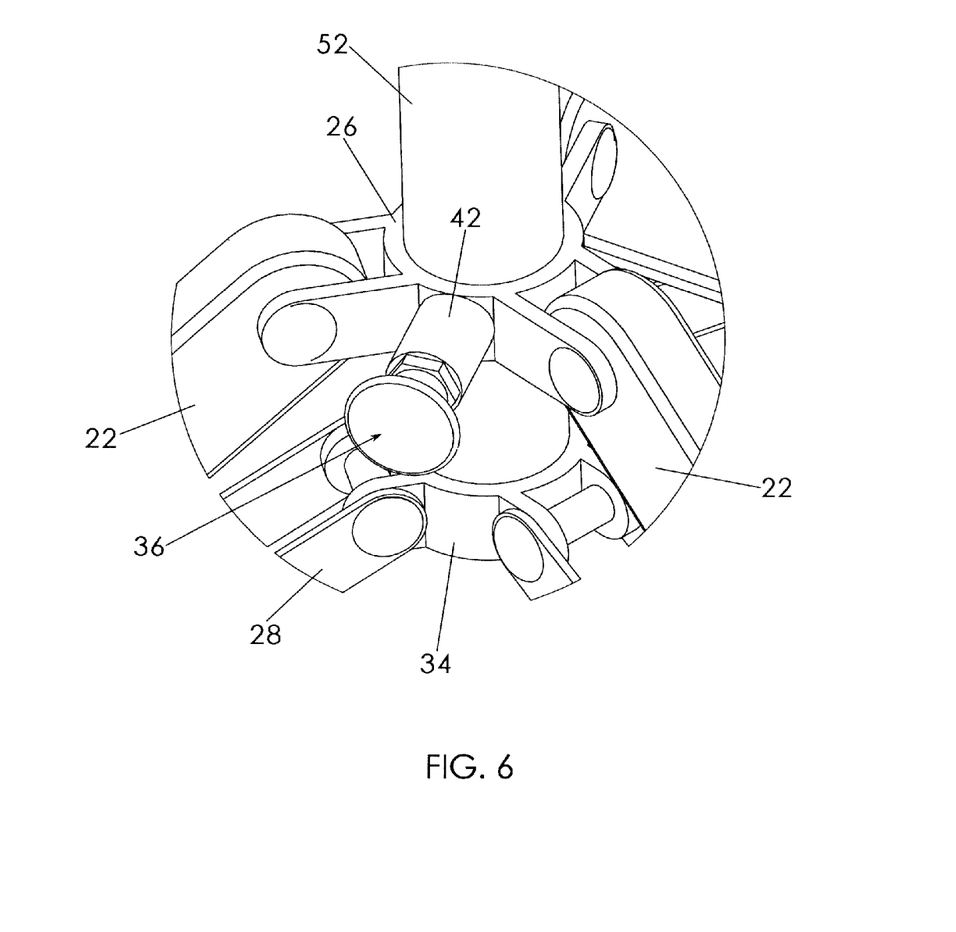
FIG. 6 is an isolated view on an enlarged scale taken from a portion of FIG. 2.
Figure 7A:
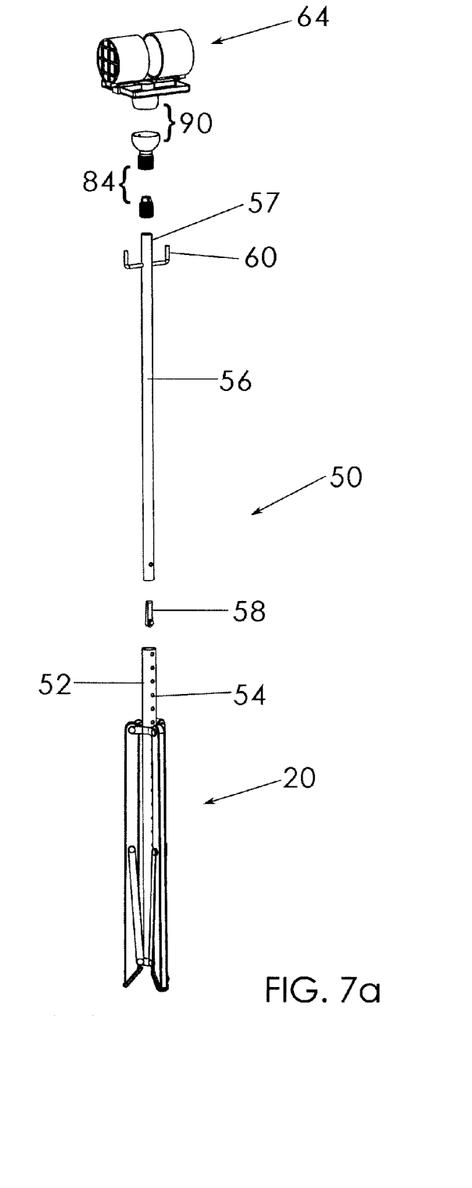
FIG. 7a is an exploded view of the stand as in FIG. 1.
Figure 7B:
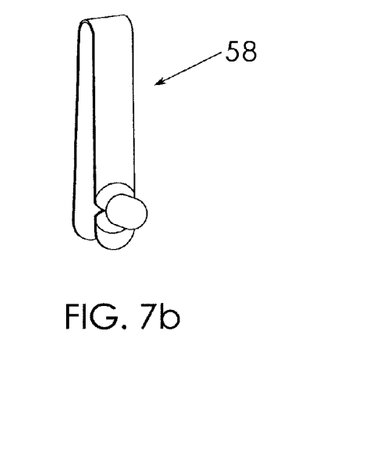
Figure 8:
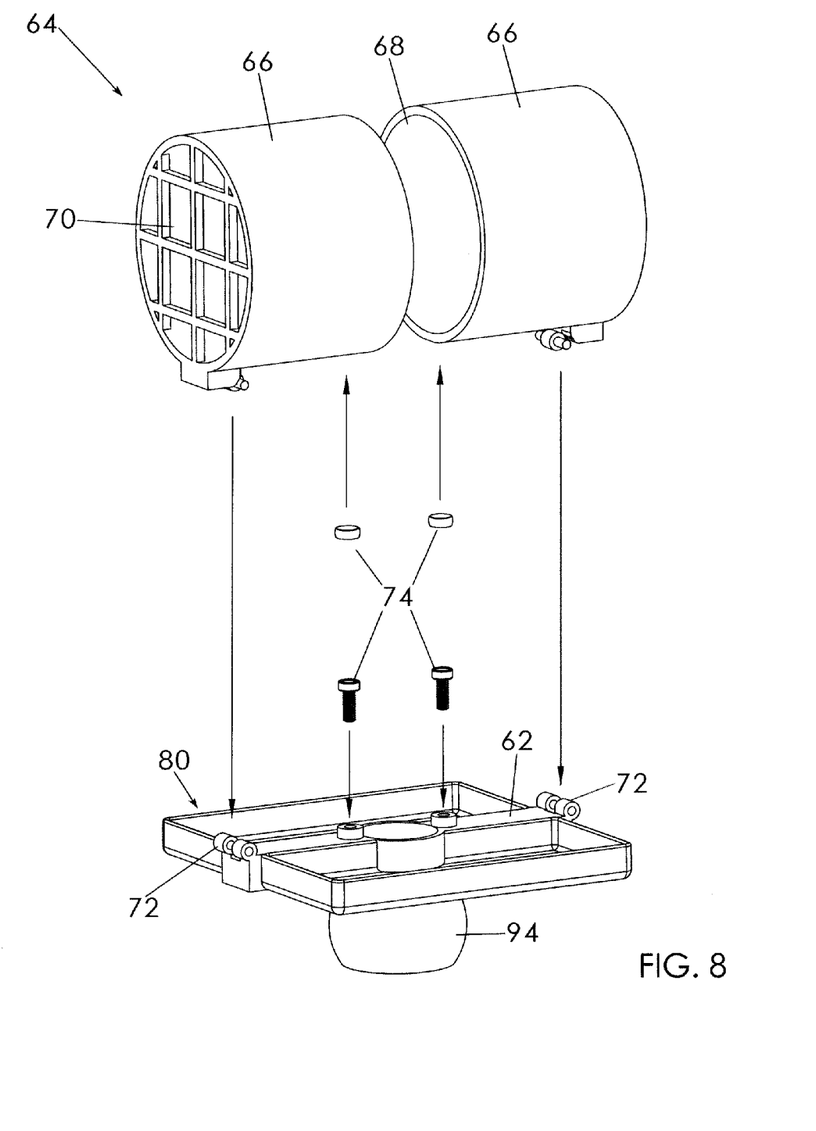
FIG. 8 is an exploded view of the cup assembly removed from the stand as in FIG. 1.

The mounting arm 62 is coupled to an upper end 57 of the second rod member 56 and extends in opposed directions generally perpendicular to the rod 50 (FIGS. 1, 4, 7a). The drink holder assembly 64 includes a pair of cylindrical containers 66, each defining an open top 68 and partially open bottom 70. Each container 66 is pivotally coupled to an opposed end of the mounting arm 62, such as with a hinge 72 (FIG. 5) such that the container 66 is movable between a storage configuration (FIG. 1) in which the open top is upwardly oriented and an extended/use configuration (FIG. 4). The drink holder assembly 64 also includes means for releasably coupling each container 66 to the mounting arm 62. In other words, the containers 66 may be coupled to the mounting arm 62 so as to selectively hold them at the storage configuration (FIG. 5). Specifically, respective first and second coupling members having complementary configurations 74 may be attached to respective surfaces of a container 66 and mounting arm 62 (FIG. 5). While snaps are preferred, other fasteners such as hook and loop fasteners, clasps, or the like may also work.

An auxiliary vertical rod 82 may also extend vertically from the drink holder assembly 64 and may be movable between extended and retracted configurations. Auxiliary hooks 83 may be attached adjacent an upper end of the auxiliary rod 82. Further, an umbrella holding member 86 may be attached to an upper end of the auxiliary rod 82 having a fabric or other flexible construction and having hook and loop fasteners for wrapping around and holding an umbrella (not shown), such as for providing shade while tailgating. In addition, the drink holding assembly 64 may include one or more trays 80 configured to hold various articles, such as food items, a person's car keys, etc. during a tailgating event.

Figure 13:
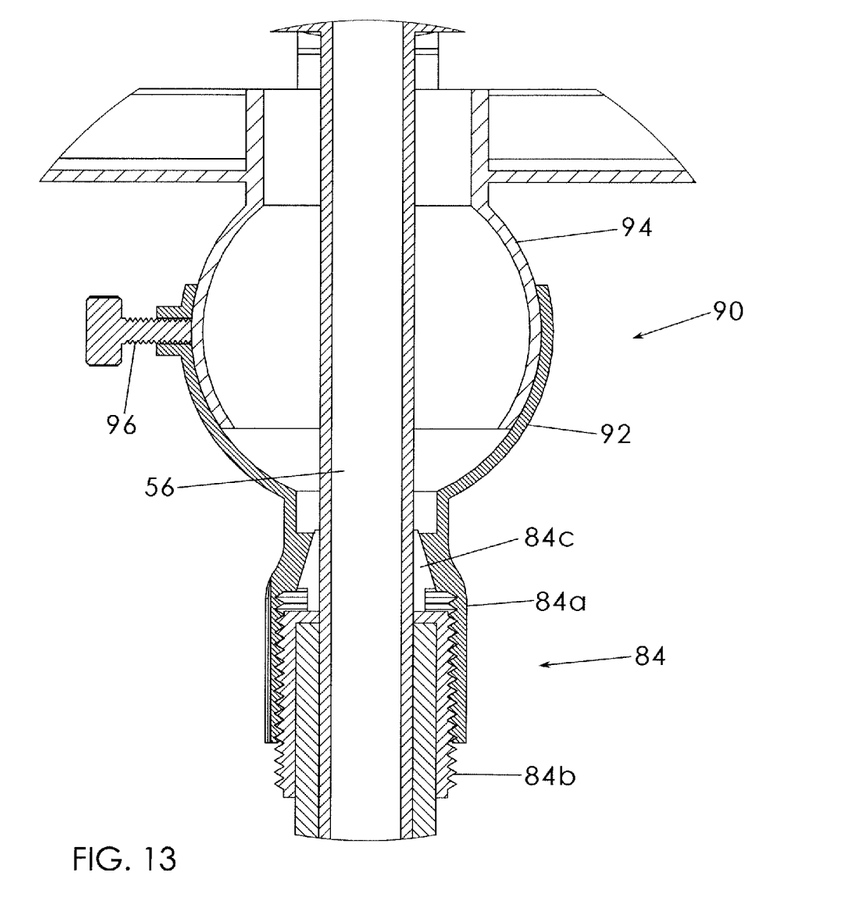
FIG. 13 is an isolated view on an enlarged scale taken from FIG. 12.
Figure 14:
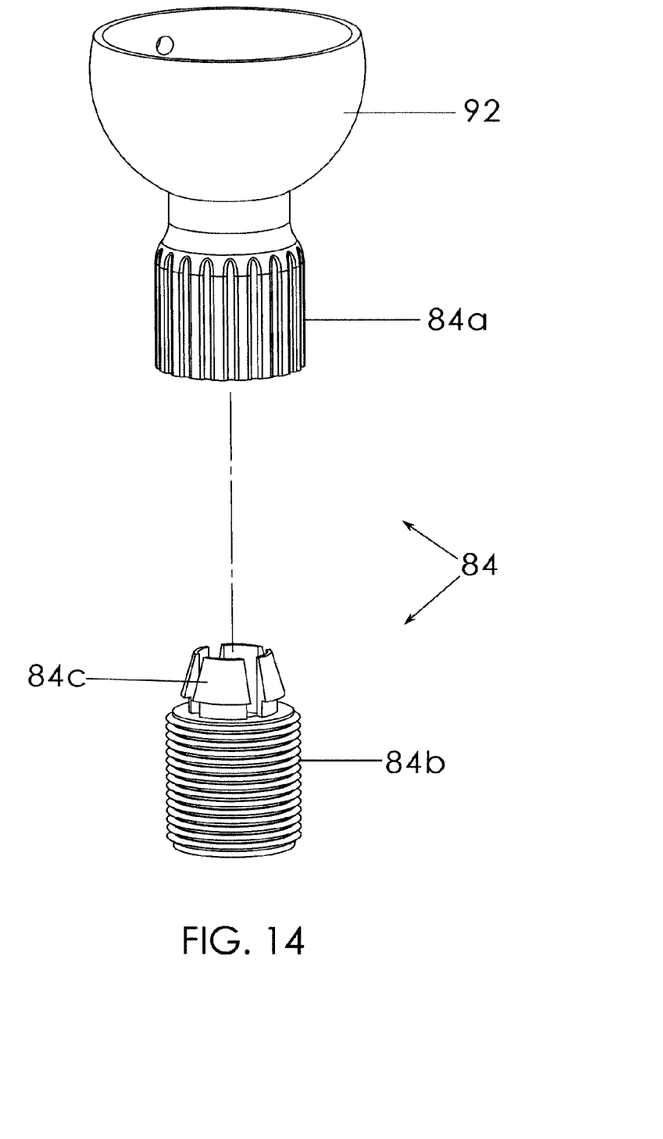
FIG. 14 is an exploded view of the leveling apparatus fastener.
Figure 15:
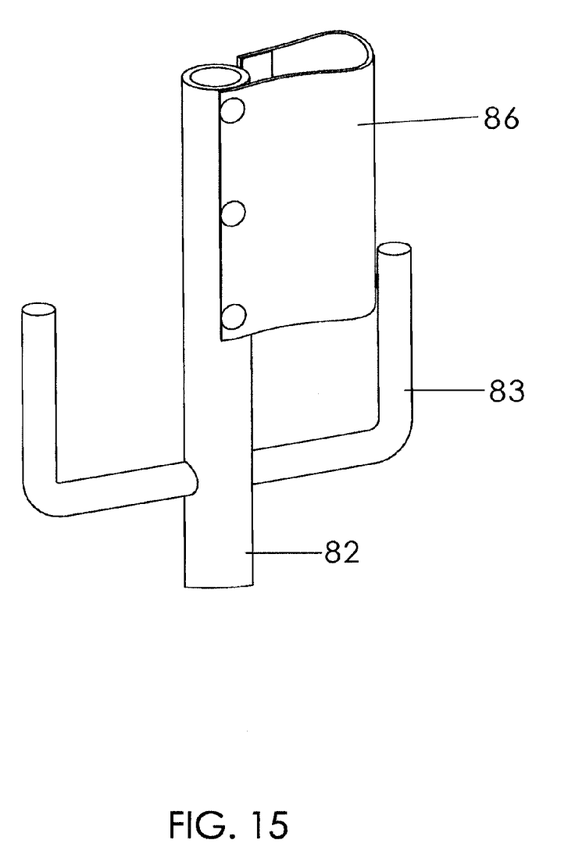
FIG. 15 is an isolated view on an enlarged scale of an upper portion of the auxiliary rod and umbrella holder.

In some embodiments, the portable and adjustable stand 10 may include a leveling assembly 90. The leveling assembly includes a base member 92 having an upwardly directed hemispherical cup shaped configuration defining an open top and an adjustment member 94 having a downwardly directed hemispherical cup shaped configuration defining an open bottom. The adjustment member 94 presents a diameter slightly smaller than a diameter of the base member 92 such that it is received therein in a friction fit yet rotatable configuration, essentially forming a ball and socket joint. Specifically, the adjustment member 94 is rotatable in a 360 degree manner. The adjustment member 94 is fixedly attached to the mounting arm 62 such that the drink holder assembly 64 may be universally positioned. As shown in FIG. 13, a pin 96 may be threadably positioned so as to selectively tighten the base member 92 and adjustment member 94 to hold in a selected position. The base member 92 is removably coupled to the upper end 57 of the second rod member 56, such as with a threadable fastener 84 (FIG. 14). More particularly, the fastener 84 may include a collet fastener in which a top portion 84a screws down on a bottom portion 84b which causes one or more wedges 84c to tighten about the rod 50.

Figure 2:
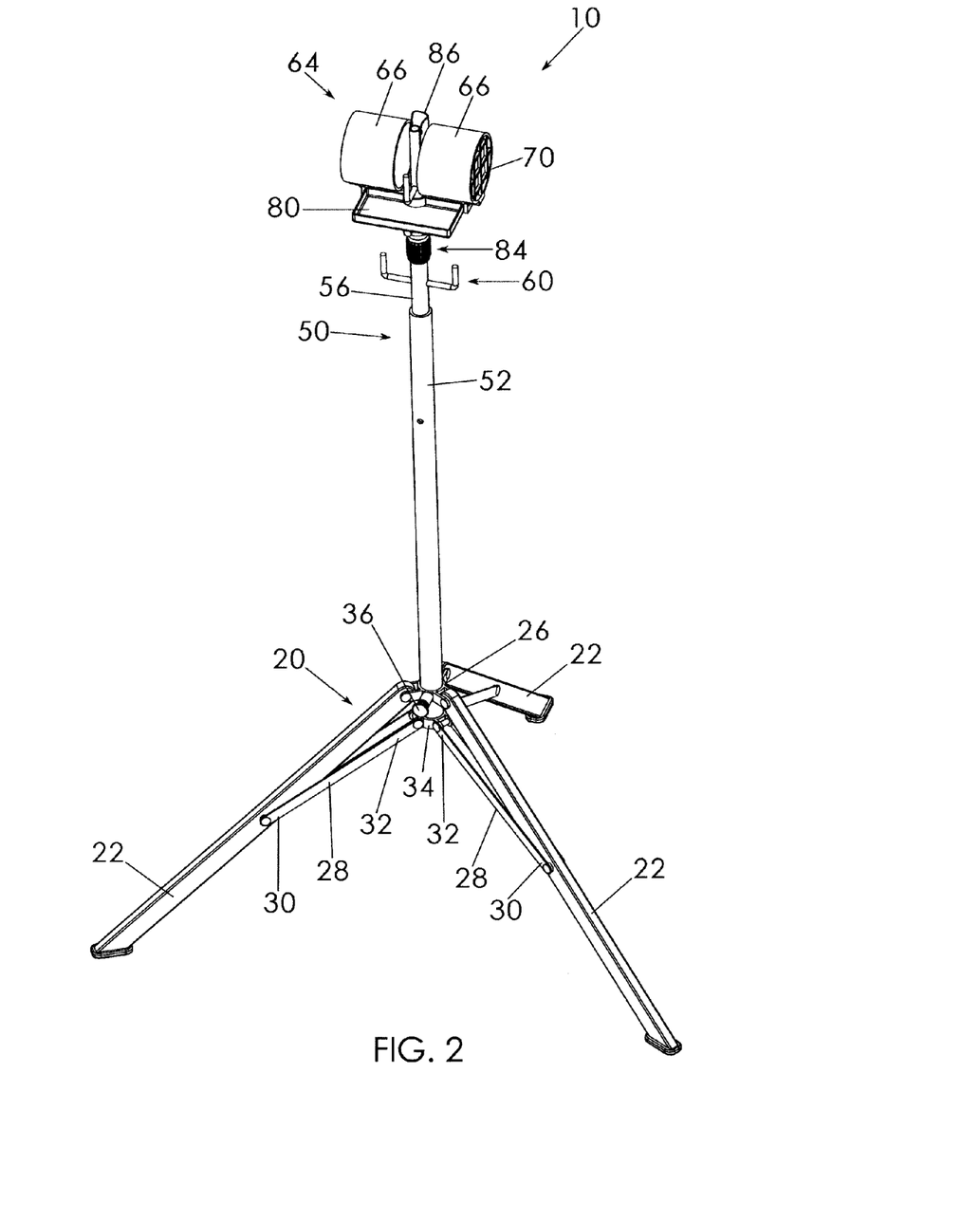
FIG. 2 is a perspective view of the stand as in FIG. 1 with a base assembly in a deployed configuration.
Figure 3:
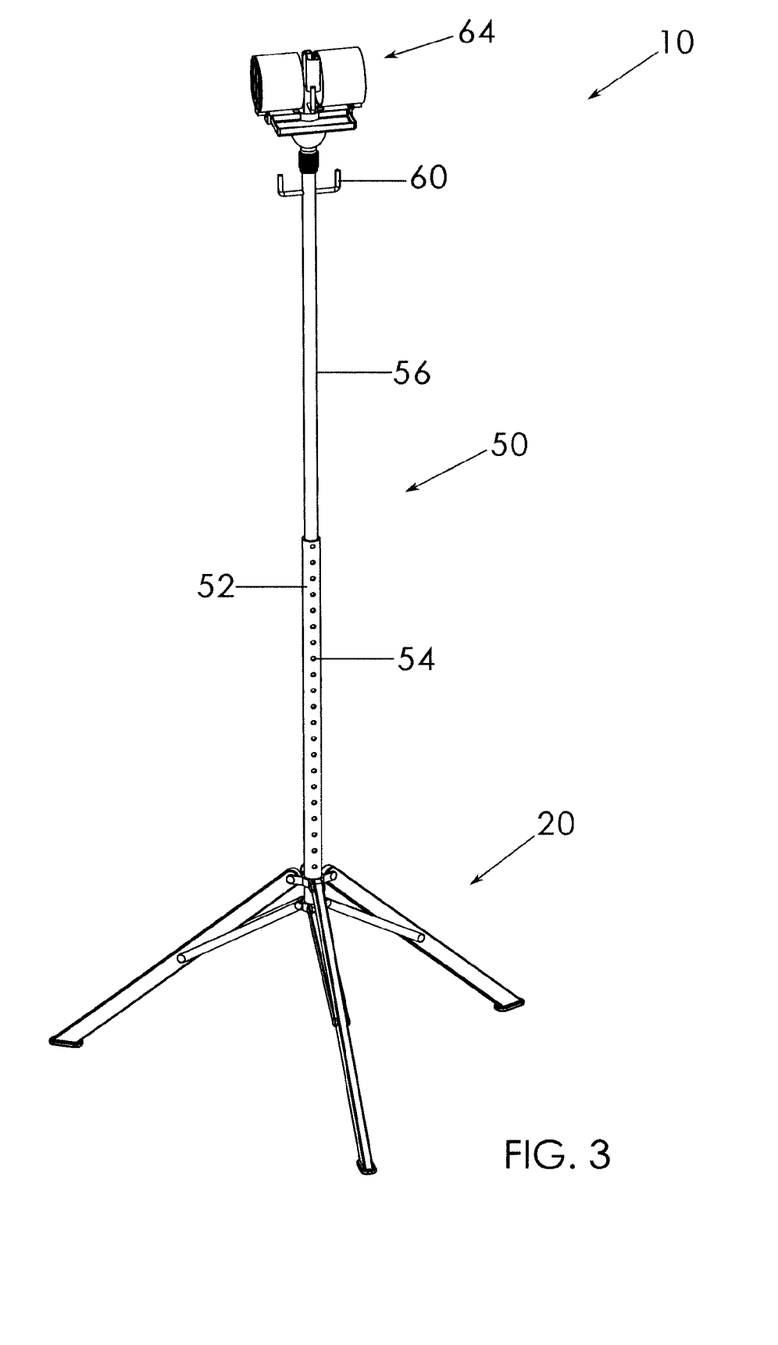
FIG. 3 is a perspective view of the stand as in FIG. 1 in a deployed and length extended configuration.

In use, a user may easily transport the portable and adjustable stand 10 to a tailgating location, such as a football stadium parking lot, and deploy it. Specifically, the base assembly 20 may be deployed by pivoting the legs from the retracted/storage configuration (FIG. 1) to the extended/use configuration (FIG. 2). Then, the length adjustable rod 50 may be extended upwardly to a desired height. The beverage containers 66 may then be released from the storage configuration (FIG. 1) and pivoted outwardly for use (FIG. 4). The leveling assembly 90 may then be adjusted to make the beverage containers 66 and trays 80 level, such as in case the stand 10 has been placed on uneven ground, e.g. in the sand at a beach. When the tailgating event is complete and it's time to pack up and go to the game, the stand 10 may be returned to its storage configuration in an opposite manner.

The invention claimed is:

1. A portable and adjustable stand, comprising:
   a length adjustable rod having a second rod member slidably received in a first rod member and movable between a retracted configuration substantially inside said first rod member and an extended configuration substantially outside of said first rod member;
   wherein said first rod member defines a plurality of spaced apart apertures;
   a fastener coupled to said second rod member that is configured to register with a respective aperture when said second rod member is moved relative to said first rod member;
   a base assembly having an end cap coupled to a lower end of said first rod member having a configuration that is slidable along said first rod member, said base assembly including at least three legs each having an upper end coupled to said end cap and configured to pivotally move between deployed and retracted configurations;
   a mounting arm coupled to an upper end of said second rod member, said mounting arm being generally perpendicular to said second rod member and extending away in opposed directions therefrom;
   a drink holder assembly having a pair of generally cylindrical containers each defining an open top, each container being pivotally coupled to an opposed distal end of said mounting arm relative to said second rod member and movable between a use configuration in which a respective open top is upwardly oriented so as to receive a beverage container and a storage configuration in which said respective open top is oriented inwardly toward said second rod member;

a leveling assembly, including:
  a base member removably coupled to said upper end of said second rod member, said base member having an upwardly directed configuration defining an open top;
  an adjustment member attached to said mounting arm, said adjustment member having a downwardly directed hemispherical configuration defining an open bottom;
  wherein said adjustment member includes a diameter slightly smaller than a diameter of said base member, said adjustment member and said base member having complementary configurations such that said adjustment member is received in said base member and movable in a rotational manner;

wherein:
  said base member and said adjustment member are coupled in a friction fit arrangement; and
  said adjustment member is movable in a 360 degree rotation with respect to said base member;

an auxiliary vertical rod coupled to one of said mounting arm and said upper end of said second rod member, said auxiliary rod extending upwardly relative to said drink holding assembly; and a holding member having a sleeve coupled to said auxiliary vertical rod.

2. The portable and adjustable stand as in claim 1, wherein:
said leveling assembly includes a fastener;
said base member defines an opening configured to receive said fastener, said fastener being configured to selectively tighten or loosen said adjustment member relative to said base member.

3. The portable and adjustable stand as in claim 1, wherein:
each container of said drink holder assembly includes a first coupling member; and
said mounting arm includes a pair of second coupling members, each second coupling member having a configuration complementary to a respective first coupling member and positioned in alignment to releasably couple with said respective first coupling member when a respective container is at said storage configuration.

4. The portable and adjustable stand as in claim 1, wherein said base assembly includes:
an auxiliary end cap coupled to said lower end of said first leg member; and
a support arm pivotally coupled at one end to a respective leg member and pivotally coupled at another end to said auxiliary end cap.

5. The portable and adjustable stand as in claim 1, wherein said base member is coupled to said upper end of said second rod member with a threaded fastener.

6. The portable and adjustable stand as in claim 5, wherein said threaded fastener is a collet fastener having a top portion that screws down on a bottom portion causing a plurality of wedges to tighten about said upper end of said second rod member.

7. The portable and adjustable stand as in claim 1, further comprising a tray coupled to said mounting arm and extending outwardly therefrom.

8. The portable and adjustable stand as in claim 1, further comprising a tray coupled to said mounting arm and extending outwardly therefrom.

9. The portable and adjustable stand as in claim 1, further comprising a hook mounted to said length adjustable rod that is configured to suspend articles.

10. The portable and adjustable stand as in claim 1, wherein said leg members are substantially parallel to said length adjustable rod when at said retracted configuration.

11. The portable and adjustable stand as in claim 1, further comprising means for selectively securing said leg members at said extended and retracted configuration.

\* \* \* \* \*